United States Patent Office 3,758,444
Patented Sept. 11, 1973

3,758,444
POLYURETHANES BASED ON ACTIVATED-LACTAM CROSS-LINKERS
Kuno Wagner, Leverkusen, Gerhard Mennicken, Opladen, and Klaus Noll, Cologne, Germany, assignors to Bayer Aktiengesellschaft, Leverkusen, Germany
No Drawing. Filed Apr. 5, 1972, Ser. No. 241,396
Claims priority, application Germany, Apr. 10, 1971, P 21 17 576.8
Int. Cl. C08g 22/16
U.S. Cl. 260—75 NH
10 Claims

ABSTRACT OF THE DISCLOSURE

Linear thermoplastic polyaddition products which are soluble in organic solvents are provided and a process for their preparation in which (1) diisocyanates are reacted with (2) compounds having a molecular weight of 400 to about 8000 and two terminal hydroxy groups and (3) the reaction product of (A) water and/or diols having a molecular weight below about 400 and/or diamines having a molecular weight below about 400 and/or hydrazines having a molecular weight below about 400 and (B) a lactam having the formula

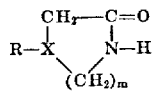

wherein X is CH or nitrogen with the proviso that when X is CH, R is hydrogen and $m$ is an integer of from 0 to 9 and when X is nitrogen, R is an aliphatic radical, an araliphatic radical or a pyridine radical which may also be substituted with a lower alkyl radical and $m$ is 3; the molar ratio of chain lengthening agent (A) and lactam (B) being from about 0.1:1 to about 10:1. The products are eminently suitable for coatings, lacquers and impregnations.

---

This invention relates to a new process for the preparation of predominantly linear thermoplastic diisocyanate polyaddition products which are soluble in organic solvents, polyaddition products obtainable by this process and the use of the diisocyanate polyaddition products obtainable by this process for the production of light-fast coatings, lacquers and impregnations.

Numerous processes have already become known for preparing both crosslinked and uncrosslinked diisocyanate polyaddition products with average and high molecular weights which are soluble in organic solvents. Water, diamines, hydrazine, hydrazine hydrate, hydrazine derivatives, carbodihydrazide, etc. are used as chain lengthening agents or crosslinking agents in these processes (DAS 1,048,408; DAS 1,122,254; DAS 1,183,196; DAS 1,278,687; DAS 1,184,947; DAS 1,184,984 and OS 2,015,603).

With the known processes of isocyanate polyaddition, however, it is hardly possible to synthesize high molecular weight polyaddition compounds which contain a large amount of urethane groups and especially of urea or hydrazodicarbonamide groups, because these groups give rise to unwanted branching during the polyaddition reaction since they contain hydrogen atoms which are reactive with isocyanate groups. Because the solubility of the polyaddition compounds and their ability to be processed as thermoplastic materials depends to a large extent on the linear structure of the macromolecule, the preparation of soluble isocyanate polyaddition products which could be processed as thermoplastic substances has previously been restricted to the production of polymers having very narrow ranges of concentrations of urethane and especially of urea or hydrazodicarbonamide groups. Thus experience has shown, for example, that the preparation of soluble polyurethane polyureas which are stable in solution and have no tendency to gel from difunctional NCO prepolymers and water or diamines as chain lengthening agents is difficult if the amount of chain lengthening urea groups present (based on the amount of unsubstituted equivalents) is greater than 1.8% by weight. Especially when chain lengthening of the NCO prepolymers is carried out at an NCO/NH₂ ratio of 0.9 to 1.2, the solutions obtained readily gel, are unstable in storage and are found, when centrifuged, to have gel contents of 10 to 20% by weight. These gel contents are not soluble e.g. even in highly polar solvents such as dimethyl formamide or dimethyl acetamide and can be dissolved only at elevated temperatures and with prolonged heating times upon thermal splitting of the crosslinking points. If the concentration of

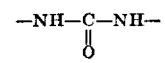

units in the solid product is increased to 4 to 6% by weight or more, the polyaddition products obtained are completely insoluble because the urea groups readily react to form biuret branching or to crosslink. Even if optimum conditions are employed in preparation, e.g. the slow addition of NCO prepolymers at low temperatures to dilute solutions of chain lengthening agents, apparently stable solutions often gel within a short time. To disperse or dissolve such products entails considerable difficulty making impossible the production of products such as rubbery elastic lacquer coatings, laminates and sheetings on supports made of wood, metal, fabric or leather and synthetic resin lacquers and coatings. Thermoplastic processing of the solvent-free products is practically impossible.

On the other hand, it is precisely those polyurethanes which have a high concentration of urea or urea-hydrazodicarbonamide linkages which are of great technical interest because the urea group particularly has a much greater tendency to form hydrogen bridge bonds than the urethane group thereby providing greater possibilities for improving the properties of high molecular weight polyaddition products by the formation of superstructures, which are super polymers formed via physical crosslinking. For example, finished products prepared from polymers possessing increased quantities of such linkages possess increased mechanical strength, toughness, hardness and dimensional stability.

It is therefore an object of this invention to provide thermoplastically processable polymers containing higher concentrations of urea or urea hydrazodicarbonamide linkages and a process for their preparation which are devoid of the foregoing disadvantages.

Another object of this invention is to provide linear thermoplastic solvent soluble polyurethane-polyureas and polyurethane-polyhydrazodicarbonamides and a process for preparing them.

A further object of this invention is to provide high molecular weight, light fast, soluble, uncrosslinked polyaddition products which contain high concentrations in percent by weight of urethane, urea and hydrazodicarbonamide linkages and which are readily thermoplastically deformed and capable of forming films from solutions.

Still another object of this invention is to provide a process which makes it possible to prepare long chained high molecular weight polyaddition products which are soluble in the usual lacquer solvents, even when comparatively inert aliphatic isocyanates are employed in their preparation.

An additional object of this invention is to provide polyaddition polymers that possess excellent light-fastness, high elasticity and other very good technical properties that make them eminently suitable for use as lacquers, and particularly quick drying coatings especially for lacquering synthetic resins and leather.

The foregoing objects and others which will become apparent from the following description are accomplished in accordance with this invention, generally speaking, by providing linear thermoplastic polyaddition products which are soluble in organic solvents by a process wherein (1) an organic diisocyanate is reacted with (2) compounds having a molecular weight of 400 to about 8000 and having two terminal hydroxy groups and (3) the reaction product of (A) water and/or diols having a molecular weight below 400 and/or diamines having a molecular weight below 400 and/or hydrazines having a molecular weight below 400 and (B) a lactam having the formula

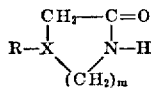

wherein X is CH or nitrogen with the proviso that when X is CH, R is hydrogen and $m$ is an integer of from 0 to 9 and when X is nitrogen, R is an aliphatic radical, an araliphatic radical or a pyridine radical which may also be substituted with a lower alkyl radical and $m$ is 3; the molar ratio of chain lengthening agent (A) and lactam (B) being from about 0.1:1 to about 10:1.

Suprisingly, polyurethanes, polyurethane ureas, polyurethane-polyurea - polyhydrazodicarbonamides or polyurethane-polyhydrazodicarbonamides, in some cases with very high urea and/or hydrazodicarbonamide concentrations, which have a very high molecular weight and are readily soluble, completely uncrosslinked and linear and therefore capable of being thermoplastically deformed or of forming films from solutions, can be obtained by a smooth and reproducible reaction if the activated chain lengthening agents described herein are used for the synthesis of the polyaddition products.

The reaction products of the chain lengthening agents which comprise water and/or diols and/or diamines and/or hydrazines having a molecular weight below about 400 and the lactams of this invention are mainly the addition products of lactam and water, or the addition products of lactams and difunctional alcohols, and the corresponding addition products of lactams and diamines or hydrazines. The reactivity of the chain lengthening agents with isocyanates is very substantially increased by this adduct formation so that the combinations of chain lengthening agents and lactam are highly activated chain lengthening systems. It is mainly due to this high reactivity that the synthesis of high molecular weight linear molecules is possible by the process of this invention since, for example, the reaction velocity of difunctional NCO prepolymers with the activated chain lengthening agents of this invention is many times higher than the reaction velocity of the same NCO prepolymer with urethane groups or urea groups. As a matter of fact, the NCO prepolymer-urea reaction which leads to branching of the molecule recedes completely in favor of the chain lengthening reaction.

Preparation of the highly activated chain lengthening agents of this invention is carried out by simply mixing lactam of the type described herein with the given chain lengthening agent at temperatures of 0° C. to 100° C., preferably 30° C. to 70° C. The products which are obtained are generally liquids which have very low viscosities even at room temperature.

The chain lengthening systems of this invention are in particular combinations of one mol of lactam with 0.1 to 10, and preferably 0.3 to 4, mols of a difunctional chain lengthening agent.

The lactams to be used in the preparation of the activated chain lengthening agents in the process of this invention are lactams of the formula:

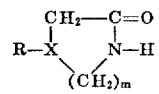

in which

X represents a CH group, in which case
R represents hydrogen, and
$m$ represents an integer of from 0 to 9, or
X represents a nitrogen atom, in which case
R represents an optionally branched $C_1$ to $C_4$ alkyl radical, a $C_7$ to $C_{14}$ aralkyl radical or a pyridyl radical, optionally substituted with $C_1$ to $C_4$ alkyl radicals, and
$m$ represents the integer 3.

Some such lactams include for example, lactams of ω-aminocarboxylic acids such as 3-aminopropionic acid, 4-aminobutyric acid, 5-aminovaleric acid, 6-aminocaproic acid, 10-aminocapric acid; N-substituted azalactams such as 1-N-methyl-hexahydro-1,4-diazepinone-(3), 1-N - butyl-hexahydro - 1,4 - diazepinone-(3), 1-N-benzyl-hexahydro-1,4-diazepinone - (3), 1-N-α-pyridyl-hexahydro-1,4-diazepinone-(3) and the like and mixtures thereof. The preferred lactams are butyrolactam, valerolactam, 1-N-methyl - hexahydro - 1,4 - diazepinone-(3) and especially ε-caprolactam.

Any chain lengthening agents within the description set forth herein can be reacted with the lactams of this invention to form the activated chain extending agents of this invention. Preferred chain lengthening agents have molecular weights of 18 to 400 especially 18 to 350. These molecular weight ranges refer to chain lengthening agents having hydroxy groups as well as to chain lengthening agents having amino groups. Some such suitable chain extending agents to be reacted with the lactams include, for example, water, diols having a molecular weight of up to 400 such as, for example, ethylene glycol, diethylene glycol, triethylene glycol, propane-1,3-diol, propane-1,2-diol, butane-1,4-diol, thiodiglycol, hexane-1,6-diol, octane-1,8-diol, dodecane-1,12-diol, 1,4-dimethylol benzene and the like; hydrazines and diamines such as, for example, hydrazine hydrate, hydrazine, N-methyl hydrazine, N,N-dimethyl hydrazine, N,N-diethyl hydrazine, ethylene diamine, trimethylene diamine, 1,2-diaminopropylene diamine, tetramethylene diamine, N-methyl-propylene-1,3-diamine, pentamethylene diamine, trimethyl-hexamethylene diamine, hexamethylene diamine, octamethylene diamine, undecamethylene diamine, diamino-methyl-cyclobutane, 1,4 - diaminocyclohexane, 1,4 - di-amino-dicyclohexylmethane, 1-methyl-2,4-diamino-cyclohexane, 1-methyl-2,6-diaminocyclohexane, m-xylylene diamine, 1-amino-3,3,5-trimethyl-5-aminomethyl-cyclohexane, p-aminobenzylamine, 3-chloro-4-aminobenzylamine, hexahydrobenzidine, 2,6-dichloro-1,4-diaminobenzene, p-phenylene diamine, tolylene-2,4-diamine, 1,3,5-triisopropylphenylene-2,4-diamine, 1,3,5 - trimethylphenylene-2,4-diamine, 1-methyl - 3,5 - diethylphenylene-2,4-diamine, 1-methyl-3,5-diethylphenylene-2,4-diamine, 1-methyl-3,4-diethylphenylene-2,6-diamine, 4,4' - diaminodiphenylmethane, 4,4-diaminodiphenyl ether and the like. Hydrazines and amines which are especially preferred are hydrazine hydrate, N,N-dimethyl hydrazine, 1-amino-3,3,5-trimethyl-5-aminomethylcyclohexane, hexamethylene diamine, m-xylylene diamine, 4,4-diamino-dicyclohexylmethane, lysine methyl ester, trimethyl hexamethylene diamine and 1-methyl-2,4-diaminocyclohexane.

The chain lengthening agents are probably activated by the lactams through the formation of an adduct which is highly reactive towards isocyanate groups. To illustrate, the following equation shows an example of the structure of one such adduct obtained when equimolecular amounts of ε-caprolactam and ethylene glycol are used:

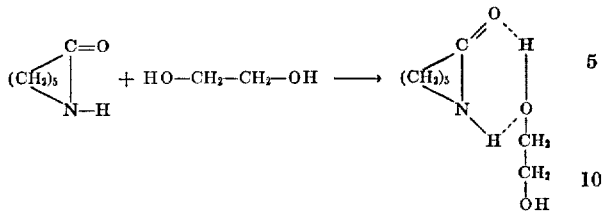

If an excess of lactam is used, the second hydroxyl group is also converted into the activated form. As explained above, however, it is not necessary to use 1 mol of lactam for each mol of the groups of chain lengthening agent which are reactive with isocyanate groups since full activation of the chain lengthening agents is achieved even with a sub-equivalent amount of lactam. This is due to the fact that the lactam is liberated in the reaction of the activated group and is immediately available to activate further groups which are reactive with isocyanate groups.

The reactivity of water towards isocyanate groups is increased by a factor 330 when an adduct of water with ε-caprolactam, for example, is used and this factor is substantially independent of the ratio of chain lengthening agent to lactam. Lactam adducts of ethylene glycol, 1,3-propylene glycol, butane-1,3-diol and the like are increased in reactivity with respect to isocyanate groups by a factor of 230 to 280 over the corresponding unmodified compounds. Even amines or hydrazines which are highly reactive towards isocyanate groups are activated to a considerable extent by formation of the adduct.

The use of the activated chain lengthening agents of this invention in diisocyanate polyaddition reactions affords the following specific advantages:

(a) Soluble, uncrosslinked polyaddition products which are free from gel particles and which contain very high concentrations in percent by weight of urethane,

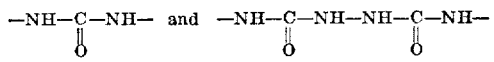

groups based on the amount of solid polyaddition product can be prepared.

(b) High molecular weight and, if desired, light-fast polyurethane-polyureas or polyurethane - polyhydrazodicarbonamides may be prepared which are soluble in the conventional solvents used in the lacquer and textile industry and which can be dissolved in solvent mixtures of aromatic hydrocarbons such as benzene, toluene, xylene and the like and alcohols such as methanol, ethanol, isopropanol and tert-butanol (proportions in the mixture 70:30 to 30:70) without the addition of dimethyl formamide in spite of the fact that they contain high concentrations of urea groups, for example, even when the concentration of such groups is 5 to 9 percent by weight. They are stable in storage and show no tendency to gel.

(c) If the lactam adducts used contain activated water, the water used as chain lengthening agent is present in the "organic soluble" form and therefore can form homogeneous mixtures with isocyanates, polyhydroxyl compounds, solvents and so on, thus insuring uniform progress of the polyaddition reaction. The same applies to lactam-diamine mixtures, lactam-water-diamine mixtures, lactam-water-hydrazine mixtures, lactam-ethylene glycol-diamine mixtures and so on; therefore, optimum chain lengthening reactions can be carried out in particular in solvent mixtures of aromatic hydrocarbons and alcohols.

(d) The use of the activated chain lengthening agents of this invention also enables polyaddition products to be prepared without catalysts and in particular without metal salts, especially without stannous and stannic salts, even if very comparatively inactive polyisocyanates are used, e.g. 1-isocyanato-3,3,5-trimethyl-5-isocyanato-methyl-cyclohexane

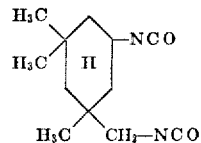

in which the NCO group attached to the secondary carbon atom reacts considerably more slowly. Polyaddition products with improved age resistance and resistance to hydrolysis and oxidation are thus obtained. If desired, the usual catalysts employed in polyisocyanate chemistry such as tert-organic bases, alkali metal salts and metal salts and the like may be added to further accelerate the polyaddition reaction. Any such catalysts may be employed such as, for example, dimethylbenzylamine, N-methylimidazole, triethylene diamine, stannous octoate, stannic dibutyl dilaurate, metal complexes of Co, Fe, Zn, Bi, Al, Cu and Ni with acetyl acetonates, ethyl acetoacetate and so on including any of those catalysts suggested in U.S. Pats. 3,201,372; 2,948,928; 2,941,967; 2,948,691 and so on.

As a rule, the activated chain lengthening agents of this invention are low viscosity liquids which are highly soluble in various organic solvents, in polyisocyanates, in NCO prepolymers, in polyhydroxyl compounds which are suitable for diisocyanate reactions and so on, thus insuring uniform progress of the reaction and chain lengthening, especially when preferred $NCO/NH_2$ ratios or $NCO/OH$ ratios of 0.9 to 1.1 are employed.

Any higher molecular weight dihydroxy compounds are suitable for the process of this invention including difunctional polyesters having molecular weights of 400 to 8000, preferably 800 to 2500, which contain terminal hydroxyl groups; difunctional polyethers with molecular weights of 400 to 8000, preferably 800 to 2500, which contain terminal hydroxyl groups, and the corresponding difunctional dihydroxy polyacetals, dihydroxy polycarbonates and the like. Examples of these and other higher molecular weight dihydroxy compounds which are common in polyurethane chemistry may be found e.g. in Kunststoff Handbuch, vol. VII, "Polyurethane," Publishers Carl Hanser-Verlag, Munich (1966), pp. 47 to 74 and U.S. Pat. 3,201,372.

Any organic diisocyanate may be used in the process of this invention including any aliphatic, cycloaliphatic, araliphatic or aromatic diisocyanates such as, for example tetramethylene-1,4-diisocyanate, pentamethylene-1,5-diisocyanate, hexamethylene - 1,6 - diisocyanate, 2,4,4-trimethyl-hexamethylene-1,6-diisocyanate, dodecamethylene-1,12-diisocyanate, 1,2-diisocyanato-methylcyclobutane, dicyclohexyl-4,4'-diisocyanate, dicyclohexylmethane-4,4'-diisocyanate, p- and m-xylylene diisocyanate, lysine methyl ester diisocyanate, 1-isocyanato-3,3,5-trimethyl-5-isocyanato-methylcyclohexane, 1-methyl-2,4-diisocyanato-cyclohexane and isomeric tolylene-2,4-diisocyanate and tolylene-2,6-diisocyanate, 4,4'-diisocyanato-diphenylmethane, 4,4'-diisocyanato-diphenyl ether, naphthylene-1,5-diisocyanate, and any diisocyanates suggested in U.S. Pat. 3,350,-362 and NCO telomers of the above mentioned diisocyanates of the type described in French patent specification No. 1593137, especially those of hexamethylene diisocyanate and 1-isocyanato-3,3,5-trimethyl-5-isocyanato-methylcyclohexane with vinyl acetate, vinyl chloride, styrene, methyl acrylate, methyl methacrylate and butyl acrylate. Diisocyanates which contain semicarbazide groups of the type mentioned in U.S. Patent 3,647,848 are also suitable, especially those obtained from 2 mols of hexamethylene diisocyanate or 1-isocyanato-3,3,5-trimethyl-5-isocyanato-methylcyclohexane and 1 mol of N,N-dimethyl hydrazine.

In a preferred method for carrying out the process of the invention, prepolymers which have terminal isocyanate groups are first prepared from the low molecular weight diisocyanates and the higher molecular weight dihydroxy compounds in a known manner by reacting an excess of the diisocyanate with the higher molecular weight dihydroxy compound. Preferably, the components are reacted at an NCO/OH ratio of 1.5 to 2.3, most preferably 1.8 to 2. The reaction of these higher molecular weight NCO terminated compounds with the activated chain lengthening agents of this invention may be carried out with or without a solvent at temperatures of −50° C. to 140° C., preferably 50° C. to 40° C. It may be advantageous to add the higher molecular weight diisocyanate, if desired together with 1 to 6 times the molar quantity of monomeric diisocyanates, to the liquid activated chain lengthening agents or their mixtures or to solutions of these activated chain lengthening agents in the reaction vessel. When this method is employed and the activated chain lengthening agent is an excess of activated diamine, high molecular weight polyaddition products which contain α,ω-diamino end groups may be prepared which are amenable to many end group modification reactions. The components may also be reacted in the reverse sequence, in which case, if an excess of NCO is used, the reaction mixture will contain polyadducts with free NCO groups which are finally reacted with impurities which may be present, i.e. by chain breaking reactions. To produce very high molecular weight polyaddition products, it is preferable to operate at a molar ratio of NCO prepolymer to active chain lengthening agent of 1:1.

The process of this invention is preferably carried out in the presence of organic solvents such as, for example, acetone, methyl ethyl ketone, methylene chloride, chloroform, perchloroethylene, methyl isopropyl ketone, benzene, toluene, xylene, ethyl acetate, butyl acetate, methyl glycol acetate, ethyl glycol acetate, tetrahydrofuran and the like and mixtures thereof.

If the chain lengthening agents used are diamines or hydrazines which have been activated as described herein, solvent mixtures may also be used which contain alcohols such as ethanol, isopropanol, butanol and so on since amines and hydrazines react preferentially with lactams with the result that the chain lengthening reaction with diamines and hydrazines proceeds much more rapidly than a chain breaking reaction with the alcohol in the solvent mixture.

Preferred solvent mixtures for the preparation of polyurethane-polyureas and polyurethane-polyurea-polyhydrazodicarbonamides are benzene/toluene/xylene/isopropanol (1:1:1); xylene/toluene/tert-butanol (1:1:1); xylene/toluene/ethyl glycol acetate/isopropanol (1:1:1:1) and especially dimeric mixtures of toluene and isopropanol or of toluene and tert-butanol in proportions by weight of 70:30 to 30:70. If desired, a proportion of highly polar solvents such as dimethyl formamide, dimethyl acetamide, tetramethyl urea and the like may be added. If the process of this invention is carried out in solution, temperatures in the range of 10° to 45° C. are preferably employed.

As explained hereinbefore, the process of this invention inter alia makes it possible for high molecular weight linear polyurethane-polyureas and polyurethane-polyhydrazodicarbonamides which have especially advantageous properties to be prepared. These compounds, which are not obtainable by known processes, characteristically contain 6 to 12, and preferably 9.6 to 10.6, percent by weight of —NH—CO—NR— units and have an intrinsic viscosity of 0.5 to 1.5 measured on a 0.5% solution in dimethyl formamide at 21° C. The radical R in the

—NH—CO—NR— unit corresponds to the N-substituent of the diamine or hydrazine used. In the case of diprimary diamines or of hydrazine or hydrazine hydrate, R represents hydrogen, whereas where N-alkyl substituted diamines or hydrazines are used, R represents a lower alkyl radical having 1 to 4 carbon atoms.

This invention, therefore, also relates to linear polyurethane - polyureas or polyurethane - polyhydrazodicarbonamides which are characterized by a content of 6 to 12 percent by weight of —NH—CO—NR— units, wherein R is hydrogen or a lower alkyl radical which linear polymers have an intrinsic viscosity of 0.5 to 1.5 measured on a 0.5% solution in dimethyl formamide at 21° C.

Another special advantage of the process of this invention is that it makes it possible to prepare long chained high molecular weight polyaddition products which are soluble in the usual lacquer solvents even when comparatively inert aliphatic isocyanates are used in their production. The polyaddition products which can be prepared in this way are characterized by excellent light-fastness and they possess high elasticity and other very good technical properties which make them highly desirable for use as lacquers. Even polyaddition products which have been prepared by the process according to the invention from diisocyanates which contain aromatically bound isocyanate groups are eminently suitable for use as binders for lacquer systems dried by physical means, provided light-fastness is not a requirement.

This invention, therefore, relates also to the use of the polyaddition products obtainable by the process according to the invention for the production of layers, lacquer coatings and impregnations.

Products which are especially suitable for use as lacquer binders are the polyaddition products produced by the process of this invention from 1-isocyanato-3,3,5-trimethyl-5-isocyanato-methylcyclohexane, m-xylylene diisocyanate, 4,4′-diisocyanato-dicyclohexylmethane or 2,6-diisocyanato-caproic acid ester or the vinyl telomers of these diisocyanates as the isocyanate component and water which has been activated according to the invention or the diamines corresponding to the above mentioned diisocyanates. The solutions of these polyaddition products, especially in the above mentioned mixtures of aromatic hydrocarbons and alcohols, are characterized by their water pale color. In addition, they have no tendency to form gels, unlimited stability in storage and excellent film-forming properties. The formation of films from lacquers containing these polyaddition products as binders is based entirely on physical drying by evaporation of the solvent. Lacquers which contain these polyaddition products as binders are especially suitable for all types of quick-drying coatings, especially for the lacquering of synthetic resins and leather.

The polyaddition products obtainable by the process of this invention are synthetic resins which can be processed thermoplastically and therefore can be converted into molded products of any shape by thermoplastic processing.

The lactam used as activator in the instant process may either be removed from the polyaddition product prepared by the process of this invention by extraction with water, for example, or it remains as a plasticizer in the synthetic resin.

If desired, the polyaddition products of this invention may be converted into crosslinked duroplastic resins with the aid of crosslinking reagents such as triisocyanates, epoxides, formaldehyde or substances which give off formaldehyde.

The invention is further illustrated but is not intended to be limited by the following examples in which all parts and percentages are by weight unless otherwise specified.

EXAMPLE 1

(A) Preparation of some activated chain lengthening agents based on ε-caprolactam 113 parts of crystalline ε-caprolactam having a melting point of 70° C. are mixed in each case at 50° C. to 70° C. with the following.

(a) 18 parts of water (1 mol)
(b) 23.4 parts of water (1.3 mols)
(c) 36 parts of water (2 mols)
(d) 54 parts of water (3 mols)
(e) 90 parts of water (5 mols)
(f) 180 parts of water (10 mols)
(g) 62 parts of ethylene glycol (1 mol)
(h) 122 parts of ethylene glycol (2 mols)
(i) 90 parts of butane-1,4-diol (1 mol)
(j) 180 parts of butane-1,4-diol (2 mols)
(k) 106 parts of thiodiglycol (1 mol)
(l) 340 parts of 1-amino-3,3,5-trimethyl-5-aminomethylcyclohexane (2 mols)
(m) 170 parts of 1-amino-3,3,5-trimethyl-5-aminomethylcyclohexane (1 mol)
(n) 170 parts of 1-amino-3,3,5-trimethyl-5-aminomethylcyclohexane and 116 parts of hexamethylene diamine (1 mol+1 mol)
(o) 136 parts of m-xylylene diamine (1 mol)
(p) 210 parts of 4,4'-diaminodicyclohexylmethan (1 mol)
(q) 74 parts of tert-butanol and
  170 parts of 1-amino-3,3,5-trimethyl-5-aminomethylcyclohexane (1 mol+1 mol)
(r) 148 parts of tert-butanol and
  340 parts of 1-amino-3,3,5-trimethyl-5-aminomethylcyclohexane (2 mols+2 mols)
(s) 60 parts of isopropanol and
  170 parts of 1-amino-3,3,5-trimethyl-5-aminomethylcyclohexane (1 mol+1 mol)
(t) 74 parts of tert-butanol and
  170 parts of 1-amino-3,3,5-trimethyl-5-aminomethylcyclohexane (1 mol+1 mol)
(u) 74 parts of tert-butanol and
  50 parts of hydrazine hydrate (1 mol+1 mol)
(v) 74 parts of tert-butanol,
  50 parts of hydrazine hydrate and
  170 parts of 1-amino-3,3,5-trimethyl-aminomethylcyclohexane (1 mol+1mol+1 mol)
(w) 90 parts of butane-1,4-diol and
  340 parts of 1-amino-3,3,5-trimethyl-5-aminomethylcyclohexane (1 mol+2 mols)
(x) 119 parts of N-methyl diethanolamine,
  50 parts of hydrazine hydrate and
  340 parts of 1-amino-3,3,5-trimethyl-5-aminomethylcyclohexane (1 mol+2 mols+2 mols)

In all cases (a) to (x), low viscosity liquids which have excellent miscibility with the various polyhydroxyl compounds, the various organic solvents and the various polyisocyanates and their NCO prepolymers and so on are obtained. All the adducts mentioned above result in activation of water and of the diols in their reactivity to NCO groups by a factor of 330 in the case of water and of 230 to 250 in the case of diols. Even the reaction velocity of diamines and of hydrazines with dilute diisocyanate solutions is increased by the factor 2 by the adduct formation with ε-caprolactam.

(B) Preparation of a higher molecular weight diisocyanate (NCO prepolymer)

200 parts (0.1 mol) of a polyester of adipic acid and ethylene glycol of OH number 56 are dehydrated at 120° C. for 30 minutes and then reacted for 7 minutes at this temperature with 33.6 parts (0.2 mol) of hexamethylene diisocyanate to produce the α,ω-diisocyanate prepolymer. NCO content: 3.6%.

(C) Process of the invention

The α,ω-diisocyanate prepolymer prepared according to (B) is diluted with 150 parts of acetone and is stirred all at once into 673 parts of a highly fluid addition compound of 1 mol ε-caprolactam and 1.2 mols of water at 60° C. A clear solution which can easily be cast is poured out onto a sheet metal support to produce a layer of 0.5 cm. in thickness which is then heated for 4 hours at 70° C. A polyurethane-polyurea is produced in the form of a porous foil with liberation of $CO_2$. This sheet is washed with water and thus is substantially freed from ε-caprolactam. The sheet is then chopped up into granules which are completely freed from small quantities of ε-caprolactam by extraction with water at 65° C. and then dried in a vacuum at 70° C. Although when preparing this polyurethane-polyurea the activated water is used in a very high excess as chain lengthening agent for the production of urea groups (approximately 59 times molar excess based on NCO), it is surprising that a very high molecular weight linear and thermoplastic polyurethane-polyurea which has an intrinsic viscosity of 1.1 as measured on a 0.5% solution measured in dimethyl formamide at 20° C. and which contains 2.53% by weight of

units is obtained without the occurrence of premature chain breaking reactions. The light-fast high molecular weight polyurethane-polyurea forms a clear solution in dimethyl formamide up to a concentration of about 22% by weight at 70° C. When films 1 mm. in thickness are produced by casting the solution, transparent, stretchable, highly elastic foils are obtained which, after stretching, have a high tensile strength of 290 (kg.wt./cm.$^2$).

EXAMPLE 2

The procedure is the same as in Example 1(B) but the hexamethylene diisocyanate in the starting material is replaced by (a) 44.4 parts of 1 - isocyanato - 3,3,5-trimethyl-5-isocyanatomethylcyclohexane,
(b) 37.6 parts of m-xylylene diisocyanate,
(c) 42 parts of trimethyl-hexamethylene diisocyanate,
(d) a mixture of
  16.8 parts of hexamethylene diisocyanate and
  22.2 parts of 1 - isocyanato - 3,3,5-trimethyl-5-isocyanatomethylcyclohexane,
(e) 58 parts of an isocyanate telomer prepared according to U.S. Patent 3,654,106 from hexamethylene diisocyanate and vinyl acetate, which telomer contains 40% of grafted polyvinyl acetate and is soluble in excess hexamethylene diisocyanate. NCO content of the solution: 29%, hexamethylene diisocyanate content: 58%,
(f) 52.4 parts of 4,4'-diisocyanato-dicyclohexylmethane,
(g) 50 parts of 4,4'-diisocyanato-diphenyl methane,
(h) 34.8 parts of 1-methyl benzene-2,4-diisocyanate.

The α,ω-diisocyanato prepolymers prepared according to (a) to (h) are reacted with activated chain lengthening agent (673 parts) of 1 mol of ε-caprolactam and 1.2 mols of water exactly as described in Example 1(C) and purified as described in Example 1. High molecular weight elastic film-forming substances are obtained which are all thermoplastic and form clear solutions, e.g. in dimethyl formamide or dimethyl acetamide without any gel formation. The polyurethane-polyureas prepared from (a), (b), (d) and (f) surprisingly form clear solutions in toluene/isopropanol 1:1), toluene/tert-butanol (70:30), xylene/isopropanol (70:30), cyclohexanone and toluene/tert-butanol/methyl ethyl ketone (40:30:30) without any addition of dimethyl formamide although strikingly the products are soluble neither in the above mentioned aromatic solvents nor in the above mentioned alcohols. When 20% solutions of polyurethane-polyureas in toluene/tert-butanol or toluene/isopropanol (1:1) of the products prepared according to (a), (b), (d) and (f) are cast on supports of wood, sheet metal, textile, leather or plastics, soft but highly elastic films are obtained which have high abrasion resistance, high folding strength and extremely high light-fastness. They may be used e.g. for the production of highly elastic lacquers and coatings.

The intrinsic viscosities of the 0.5% solutions in DMF of the polyaddition products described above are in the region of 0.85 to 1.2. The amount of urea units contained in them is between 2.36 and 2.48% by weight.

EXAMPLE 3

200 parts (0.1 mol) of a polyester of adipic acid and ethylene glycol of OH number 56 are dehydrated for 30 minutes at 120° C. and then reacted at this temperature with 44.4 parts of 1 - isocyanato - 3,3,5-trimethyl-5-isocyanato-methylcyclohexane (0.2 mol) for 30 minutes to produce the α,ω-diisocyanato prepolymer. The NCO prepolymer is left to cool to 100° C., then diluted with 100 parts of toluene and cooled to 25° C. This solution of the NCO prepolymer is then introduced dropwise with rapid stirring in the course of 20 minutes into a solution of 22.6 parts of the activated chain lengthening agent prepared in Example 1 according to 1(A) in 422 parts toluene and 522 parts of tert-butanol. A viscous, water clear solution of a polyurethane-polyurea is obtained which contains about 20% of high molecular weight solids; it is completely free from gel particles and indefinitely stable in storage, undergoing no change in the course of half a year either at room temperature or at 50° C. The solution has a viscosity of 28,730 cp. at 21° C. The dissolved polyurethane-polyureas contain α,ω-diamino end groups which are converted quantitatively into the corresponding α,ω-urea-methoxy methyl ether by the addition of 2 parts of methoxy methyl isocyanate. The end groups produced lead to further condensation or crosslinking of the polymeric film forming substance at 140° C.

If the instructions given in this example are repeated exactly, using as activated chain lengthening agent in each case 0.1 mol of the activated amine chain lengthening agents described in Example 1 under (A) (m), (n), (o), (p), (q), (u), (v), (w) and (x), the products obtained are again completely clear 20% solutions of high molecular weight polyurethanepolyureas or polyurethane-polyhydrazodicarbonamides which are indefinitely stable on storage and completely free from gel particles. In the form of 20% solutions in toluene/tert-butanol (1:1) they have the viscosities indicated below, and they practically all have α,ω-diamino or hydrazide end groups.

(m) Polyurethane-polyurea: $\eta_{21° C.}$: 26,700 cp.
(n) Polyurethane-polyurea with urea group sequences of hexamethylene diamine and isophorone diamine (1:1); $\eta_{21° C.}$: 45,000 cp.
(o) Polyurethane-polyurea: $\eta_{21° C.}$ : 38,900 cp.
(p) Polyurethane-polyurea: $\eta_{21° C.}$: 26,900 cp.
(q) Polyurethane-polyurea: $\eta_{21° C.}$: 27,400 cp.
(u) Polyurethane-polyhydrazodicarbonamide: $\eta_{21° C.}$: 24,500 cp.
(v) Polyurethane-polyurea - polyhydrazodicarbonamide: $\eta_{21° C.}$: 24,300 cp.
(w) Polyurethane-polyurea: $\eta_{21° C.}$: 29,500 cp.
(x) Polyurethane-polyurea - polyhydrazodicarbonamide: $\eta_{21° C.}$: 35,800 cp.

When 100 parts of the solutions (20% by weight) of high molecular weight polyurethane-polyurea or of polyurethane-polyureapolyhydrazodicarbonamide prepared in this example which contain α,ω-amino end groups are rapidly mixed with stirring with 5 parts of a biuret triisocyanate obtained from 3 mols of hexamethylene diisocyanate, 3 mols of 1-isocyanato-3,3,5-trimethyl-5-isocyanato-methylcyclohexane and 1 mol of water and the mixtures are painted on glass, sheet metal or wood surfaces, soft abrasion resistant lacquers or coatings which are extremely light-fast are obtained.

EXAMPLE 4

This example illustrates particularly clearly that, in contrast to all the process previously described in the literature, the process of this invention makes it possible to produce substantially linear polyurethane-polyureas which have extremely high concentrations of

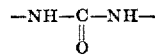

without premature crosslinking and without any gel content in the solutions obtained.

220 parts (0.1 mol) of a polyester of adipic acid and butane-1,4-diol having an OH number 51 are reacted as described in Example 3 with 44.4 parts of 1-isocyanato-3,3,5-trimethyl-5-isocyanato-methylcyclohexane (0.2 mol) to produce the α,ω-diisocyanato prepolymer which is then diluted at 95° C. with a solution of 44.4 parts of 1-isocyanate-3,3,5-trimethyl-5-isocyanato - methylcyclohexane (0.2 mol) in 100 parts of toluene. The solution obtained contains 0.1 mol of a macro-diisocyanate (NCO prepolymer) and 0.2 mol of the monomer 1-isocyanato-3,3,5-trimethyl-5-isocyanatomethyl-cyclohexane. This solution is introduced into a graduated dropping funnel (420 cc.). 390 cc. of this prepolymer solution are added dropwise with vigorous stirring at 20 to 25° C. into a solution of 620 parts of toluene, and 720 parts of tert-butanol and 68 parts of the activated chain lengthening agent described in Example 1(A) (NCO/NH₂ ratio=0.93) in the course of 20 minutes. A viscous, water-clear solution of a polyurethane-polyurea which contains aobut 20% by weight of high molecular weight solids is obtained. The concentration of

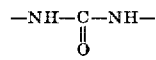

units is about 10.2% by weight in the isolated, dried high polymer polyurethane-polyurea. The polyurethane-polyureas dissolved at a concentration of about 20% in the above mentioned solvent mixture of toluene/tert-butanol or toluene/isopropanol have a viscosity of 1544 cp. at 21° C. ($\eta_i$=0.55). The solutions which have α,ω-diamino end groups are indefinitely stable. Even after 6 months' storage, no polyester aminolysis with severe viscosity drop is observed because surprisingly, the free terminal amino groups do not give rise to aminolysis of the polyester bond. The solutions obtained are completely free from gel particles. When 100 parts of the above mentioned solutions are reacted with 5 parts of trifunctional light-fast biuret polyisocyanates or urethane-containing polyisocyanates of hexamethylene diisocyanate, 1-isocyanato-3,3,5-trimethyl-5-isocyanato - methylcyclohexane, 4,4'-diisocyanato-dicyclohexylmethane, m-xylylene diisocyanate or 2,6-diisocyanato-caproic acid methyl ester, the films obtained by casting the resulting mixtures on supports such as wood, sheet metal, woven fabric, leather or synthetic resins such as polyvinyl chloride, polyurethanes or polyesters give rise to firmly bonded, elatic, crosslinked, hard lacquer coats which have extremely high light-fastness and good resistance to chemicals.

If the solutions of the polymeric film-forming substances which have a high urea group concentration are cast to form films, coatings etc. without additional crosslinking agents, due to their high urea group concentration and the consequent physical crosslinking which sets in via the hydrogen bridge bonds, they also act as high quality light-fast film-forming substances which are completely resistant to toluene, alcohols and aliphatic hydrocarbons.

If the polyaddition described in this example is carried out in the reverse sequence, the activated chain lengthening agent being introduced dropwise into a suitably dilute solution of the NCO prepolymers in toluene/tert-butanol (620/780) at an NCO/NH₂ ratio of 1.17 so that NCO end groups are always available during synthesis of the macromolecule, high molecular weight polyureas containing α,ω-NCO groups are again obtained in a smooth reaction. The viscosity of 20% solutions in above solvent mixture is 1850 cp. at 21° C. The NCO groups become saturated with ε-caprolactam or tert-butanol by addition after 4 days' storage at room temperature and are indefinitely stable in storage ($\eta_1=0.59$).

EXAMPLE 5

This example shows that, surprisingly, polyurethane-polyureas of Example 4 which have extremely high urea group concentrations can be prepared as completely non-tacky, pourable powders. These powders are still soluble in dimethyl formamide, dimethyl acetamide or solvent mixtures of toluene/tert-butanol (1:1) or toluene/isopropanol (1:1) after indefinite periods of storage.

The procedure is the same as in Example 4 but the solvent used for dissolving the NCO prepolymer which contains 1-isocyanato-3,3,5-trimethyl-5-isocyanato-methylcyclohexane and which has been prepared from 200 parts of a polyester of adipic acid and ethylene glycol of OH number 56 and 44.4 parts of 1-isocyanato-3,3,5-trimethyl-5-isocyanato-methylcyclohexane is 100 parts of acetone. This solution is introduced dropwise into 1350 parts of the low viscosity activated chain lengthening agent (A)(e) of Example 1 which, in addition, contains in solution 51 parts (0.3 mol) of 1-amino-3,3,5-trimethyl-5-aminomethylcyclohexane. The reaction mixture is rapidly stirred during dropwise addition of the prepolymer solution and when reaction is completed, 400 parts of water are added to the reaction mixture. A non-tacky powder is obtained after 5 hours which is filtered off and stirred up several times with water and freed from ε-caprolactam. 10% solutions of this dry powder in toluene/tert-butanol (1:1) dry on wood, metal, synthetic resin, textile and leather supports to form elastic, hard and completely light-fast coatings. Urea group concentrations: 9.6% by weight; internal viscosity of the 0.5% solution in dimethyl formamide: 0.85.

EXAMPLE 6

200 parts (0.1 mol) of a propylene glycol polyether of OH number 56 are dehydrated under vacuum at 130° C. for 30 minutes and then cooled to 110° C. and 0.2 part of tin-II-octoate and 44.4 parts (0.2 mol) of 1-isocyanato-3,3,5-trimethyl-5-isocyanato - methylcyclohexane are added, the temperature rising to 123° C. within 1 minute. The formation of the prepolymer is completed after 4 minutes. The NCO prepolymer is diluted with 100 parts of toluene and the solution is cooled to 25° C. and introduced dropwise with vigorous stirring in the course of 20 minutes into a solution of 22.6 parts of the activated chain lengthening agent prepared in Example 1 according to (A) dissolved in 630 parts of toluene and 314 parts of tert-butanol. A water-pale solution of a polyurethane-polyurea which contains polyether segments and which has a solids content of about 20% is obtained.

The solution is completely free from gel, indefinitely stable on storage and has a viscosity of 350 cp. at 21° C. When the solution is painted on supports of glass, sheet metal, wood or plastics, soft, completely transparent coatings with extremely high light-fastness are obtained after evaporation of the solvent mixture. Internal viscosity: 0.65; —NH—CO—NH— content: 4.44%.

EXAMPLE 7

This example shows the preparation of uncrosslinked soluble polyurethanes with the activated chain lengthening agents of the invention may also be carried out solvent-free in the melt at elevated temperatures, e.g. at 110° C. to 120° C.

200 parts of a polyester of adipic acid and ethylene glycol of OH number 56 are dehydrated under vacuum at 120° C. for 30 minutes and then reacted at 120° C. with 105 parts of 4,4'-diisocyanato-diphenylmethane for 15 minutes. 40.6 parts of the low viscosity addition product of 1 mol of ε-caprolactam and 1 mol of 1,4-butylene glycol are then stirred into the hot melt. The hot melt is immediately poured on a sheet metal support at 110° C. and heated for 4 hours at 110° C. The polyurethane sheet obtained is then granulated. 25 parts of the granules dissolve in 80 parts of dimethyl formamide at 110° C. to form a clear solution which is stable on storage and can be kept indefinitely without showing any tendency to gel formation. Viscosity at 21° C.: 250 cp.

EXAMPLE 8

200 parts by weight (0.1 mol) of a polyester from adipic acid and ethylene glycol having an OH-number of 56 are heated for 30 minutes to 120° C. and subsequently reacted at this temperature for 30 minutes with 44.4 parts by weight of 1-isocyanato - 3,3,5 - trimethyl-5-isocyanatomethylcyclohexae (0.2 mol). Thus the corresponding α,ω-diisocyanato prepolymer is obtained. The temperature of the prepolymer is allowed to drop to 100° C., 200 parts by weight of toluene are added and the solution is cooled to 25° C. A mixture consisting of 322 parts by weight of toluene, 522 parts by weight of isopropanol and 23.4 parts by weight of a liquid activated chain lengthening agent prepared from 1 mol of 1-N-methyl-hexahydro-1,4-diazepinon-3 and 2 mols of 1-amino-3,3,5-trimethyl-5-aminomethyl-cyclohexane is subsequently added during 30 minutes under stirring. A water clear solution is obtained having a solids content of 20 percent by weight. The solids of this solution consist of a high molecular polyester-polyurethane-polyurea. The solution is storage-stable and has a viscosity of 12,500 cp. at 25° C.

EXAMPLE 9

200 parts of weight (0.1 mol) of a propyleneglycol-polyether having an OH-number of 56 are heated for 30 minutes to 130° C. in vacuum. Subsequently the polyether is cooled to 100° C. 0.2 parts by weight of tin-II-octoate and 44.4 parts by weight (0.2 mol) of 1-isocyanato-3,3,5-trimethyl-5-isocyanatomethyl - cyclohexane are added. The temperature rises to 122° C. The prepolymer formation is completed after 4 minutes. 200 parts by weight of toluene are added and the solution is allowed to cool to 25° C. A mixture consisting of 322 parts by weight of toluene, 522 parts by weight of isopropanol and 30.7 parts by weight of a liquid activated chain lengthening agent from 1 mol of 1-N-ethyl-hexahydro-1,4-diazepinon-3 and 2 mols of 3,3'-dimethyl - 4,4' - di-aminodicyclohexylmethane is added dropwise under stirring. A water clear solution of a polyurethane polyurea having polyether segments is obtained which solution has a solids content of 20.8 percent by weight. The solution does not contain any gel-like particles and has a viscosity of 1200 cp. at 25° C. If this solution is applied on surfaces consisting of glass, iron, wood, leather or plastic material films are obtainable which after evaporation of the solvent have an excellent adhesion on the substrates and which show an excellent gloss.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Linear, solvent soluble thermoplastic polyaddition polymers which are prepared by reacting (1) an organic diisocyanate with (2) an organic compound having two terminal hydroxy groups and a molecular weight of 400 to 8000 and (3) an activated chain extending agent prepared by reacting (A) a member of the group consisting of water, diols having a molecular weight below 400, diamines having a molecular weight below 400, hydrazines having a molecular weight below 400 and mixtures thereof with (B) a lactam having the formula

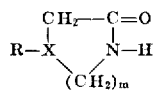

wherein X is —CH or nitrogen with the proviso that when X is —CH, R is hydrogen and $m$ is an integer of from 0 to 9 and when X is nitrogen, R is an $C_1$–$C_4$ alkyl, $C_7$–$C_{14}$ aralkyl, pyridyl or $C_1$–$C_4$ alkyl substituted pyridyl radical and $m$ is 3; the molar ratio of (A) to (B) being from about 0.1:1 to 10:1.

2. The polymer of claim 1 wherein the lactam is ε-caprolactam.

3. The polymer of claim 1 which is characterized by a content of from about 6 to about 12% by weight of —NH—CO—NR— units in which R is hydrogen or a lower alkyl radical.

4. The polymer of claim 1 wherein a 0.5% solution in dimethylformamide at 21° C. shows an intrinsic viscosity of 0.5 to 1.5.

5. A process for preparing the polymer of claim 1 which comprises reacting (1) an organic diisocyanate with (2) an organic compound having two terminal hydroxy groups and a molecular weight of 400 to 8000 and (3) an activated chain extending agent prepared by reacting (A) a member of the group consisting of water, diols having a molecular weight below 400, diamines having a molecular weight below 400, hydrazines having a molecular weight below 400 and mixtures thereof with (B) a lactam having the formula

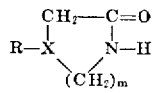

wherein X is —CH or nitrogen with the proviso that when X is —CH, R is hydrogen and $m$ is an integer of from 0 to 9 and when X is nitrogen, R is an $C_1$–$C_4$ alkyl, $C_7$–$C_{14}$ aralkyl, pyridyl or $C_1$–$C_4$ alkyl substituted pyridyl radical and $m$ is 3; the molar ratio of (A) to (B) from about 0.1:1 to 10:1.

6. The process of claim 5 which is carried out in solution in an organic solvent.

7. The process of claim 5 wherein the lactam is ε-caprolactam.

8. The process of claim 5 wherein a prepolymer is first prepared by reacting an excess of the organic diisocyanate with the organic compound having two terminal hydroxy groups and a molecular weight of 400 to 8000, and reacting the prepolymer thus formed with the activated chain extending agent.

9. The process of claim 8 wherein the prepolymer is prepared at an NCO/OH ratio of 1.5 to 2.3.

10. The process of claim 8 wherein the prepolymer is reacted with the activated chain extending agent at a molar ratio of 1.1.

References Cited

UNITED STATES PATENTS

| | | |
|---|---|---|
| 3,511,893 | 5/1970 | Schoeffer et al. |
| 3,554,979 | 1/1971 | Hunt. |
| 3,565,849 | 2/1971 | Peters. |
| 3,567,692 | 3/1971 | Haggis et al. |
| 3,609,112 | 9/1971 | Schroeder et al. |
| 3,640,937 | 2/1972 | Thoma et al. |

FOREIGN PATENTS

| | | |
|---|---|---|
| 1,222,842 | 2/1971 | Great Britain. |

DONALD E. CZAJA, Primary Examiner

H. S. COCKERAM, Assistant Examiner

U.S. Cl. X.R.

17—161 KP; 161—190; 260—32.4, 33.4, 33.6, 75 NE